F. P. LOVEJOY.
METAL WORKING TOOL.
APPLICATION FILED MAY 3, 1917.
1,242,707.
Patented Oct. 9, 1917.
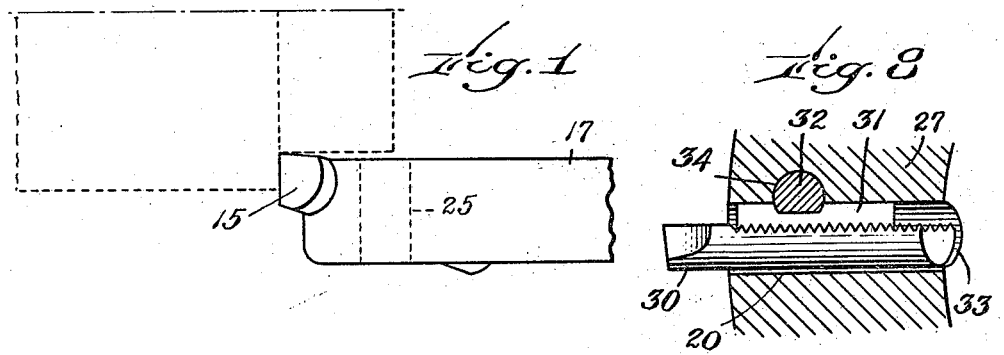
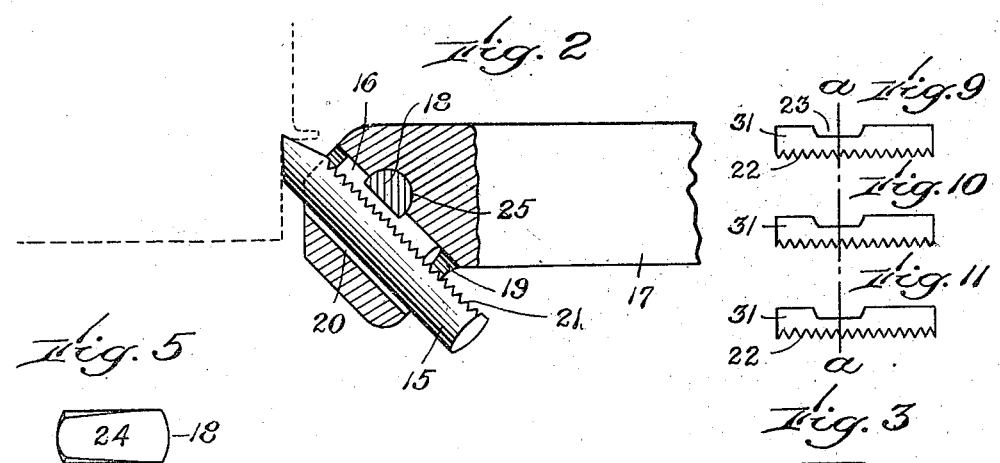
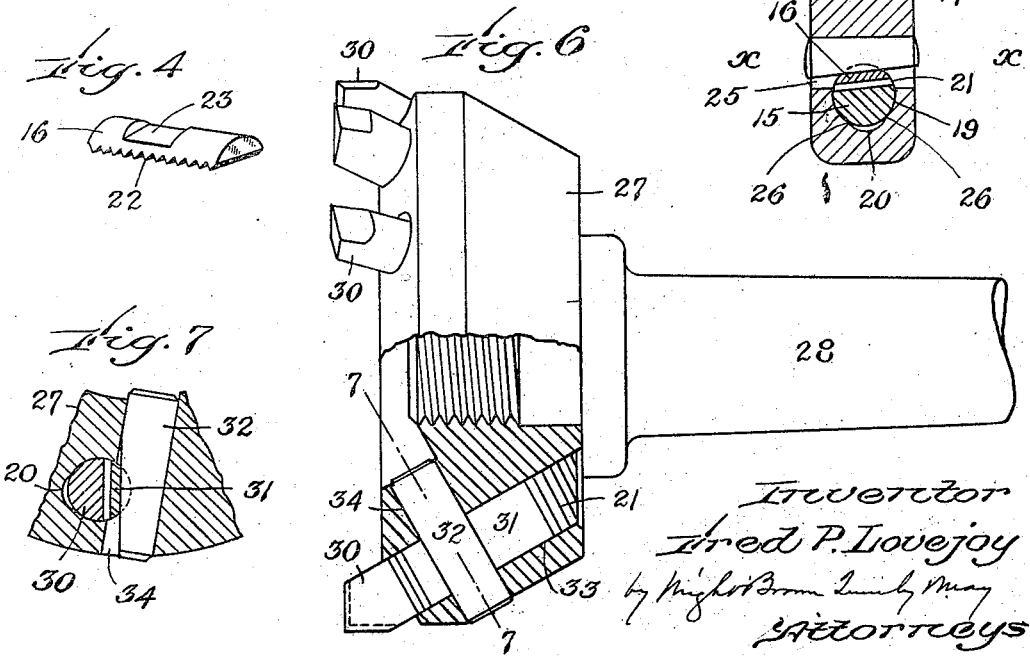
Inventor
Fred P. Lovejoy
by Hughes Brown Quimby May
Attorneys

UNITED STATES PATENT OFFICE.

FRED P. LOVEJOY, OF SPRINGFIELD, VERMONT.

METAL-WORKING TOOL.

1,242,707.   Specification of Letters Patent.   Patented Oct. 9, 1917.

Application filed May 3, 1917. Serial No. 166,146.

*To all whom it may concern:*

Be it known that I, FRED P. LOVEJOY, a citizen of the United States, residing at Springfield, in the county of Windsor and State of Vermont, have invented new and useful Improvements in Metal-Working Tools, of which the following is a specification.

This invention relates to metal-working tools and its object is to provide improved means for fastening a detachable cutter in a holder therefor. The cutter is provided with a series of teeth or ribs that extend substantially at right angles to its axis. A shoe having corresponding teeth or ribs coacts with the cutter, and the cutter and shoe are arranged in a socket formed in a suitable holder. The cutter and shoe are locked as a unit in the holder by a cotter pin, the axis of which is substantially at right angles to the axis of the cutter. The shoe is formed with a notch to receive the cotter and is locked by the latter. Furthermore the cotter is provided with an inclined surface that acts with wedging effect upon the shoe to tighten the cutter relatively to the holder. The cutter is thus interlocked with the shoe by the aforesaid teeth or ribs, and the shoe is interlocked with the cotter, so that all the said elements are positively interlocked with each other in addition to being tightened by the aforesaid wedging action of the cotter.

When the cutter and shoe are removed from their socket in the holder they are capable of being adjusted endwise relatively to each other to determine the ultimate longitudinal position of the cutter when the latter is fastened in the holder, but when the cutter and shoe have been interlocked with each other and inserted as a unit into the socket provided therefor, it is impossible for them to lose such adjustment because the socket maintains their interlocked relation. The shoe must always occupy the same position relatively to the holder, in order to receive the cotter, and it is therefore impossible to give the cutter any other position than that determined by the relation of the cutter and shoe prior to inserting them in their socket. The invention is capable of being embodied in a turning tool or in a boring tool or reamer, and in the latter case the holder would be provided with a circular series of sockets for a corresponding number of cutters, shoes, and cotters. In the case of a boring tool it is desirable to have some of the cutters advanced more than those that precede them, in order to distribute the load as nearly equally as possible among the cutters. Such relation of the cutters may be readily accomplished by variations in the locations of the teeth of the shoes. The shoes are capable of being interchanged, one with another, and if the desired adjustment of any cutter cannot be obtained with one shoe, it may be obtained with another shoe having a different arrangement of teeth.

Referring to the accompanying drawings:

Figure 1 represents a top plan view of a turning tool embodying the present invention.

Fig. 2 represents a longitudinal sectional view in a vertical plane, of said tool.

Fig. 3 represents a sectional view through the structure on a transverse plane to which the axis of the cutter is perpendicular.

Fig. 4 represents a perspective view of the locking shoe.

Fig. 5 represents an elevation of the cotter, the flat shoe-engaging surface thereof being foremost.

Fig. 6 represents a side elevation partly in section of a turning tool or reamer embodying the present invention.

Fig. 7 represents a section through the structure intersected by line 7—7 of Fig. 6.

Fig. 8 represents a section through the structure on a plane longitudinal of the cutter.

Figs. 9, 10, and 11 represent side elevations of three locking shoes that differ from each other in the arrangement of the locking teeth.

The same reference characters indicate the same parts wherever they occur.

Referring first to the turning tool shown by Figs. 1 to 5 inclusive, the cutter is indicated at 15, the locking shoe at 16, the holder at 17, and the cotter at 18. In the present instance the cutter 15 and shoe 16 have, collectively, a cylindric formation, and the holder 17 is provided with a substantially cylindric socket 19 in which the cutter and shoe are adapted to fit. Said socket is however preferably cut away as indicated at 20, to increase the steadiness of the cutter relatively to the holder, as will be understood after further description.

The cutter is provided with a series of teeth or ribs 21 that extend substantially at right angles to its axis, and the shoe 16 is provided with corresponding teeth or ribs 22 that are adapted to be interlocked with teeth 21 as shown by Fig. 2. When the cutter and shoe are in socket 19 they are incapable of longitudinal movement relatively to each other, and when assembling the parts it is necessary to arrange the shoe in interlocked relation with the cutter in order to get them into the socket.

The shoe is provided with a notch 23 for the reception of the cotter 18. This cotter is cylindric in form excepting that it is cut away along one side to provide a flat face 24 at an acute angle relatively to its axis. The axis of the cotter is indicated by line $x$—$x$ in Fig. 3. The flat face 24 is adapted to bear upon the bottom of notch 23 when the parts are assembled as shown by Figs. 2 and 3. When the cotter is seated in notch 23 the shoe is locked against endwise movement and the inclined face 24 exerts a wedging action upon the shoe whereby the latter is forced transversely against the cutter and the latter is forced transversely against the wall of socket 19. A cylindric socket 25 is formed in the holder for the reception of the cotter, said socket being substantially at right angles to socket 19 and intersecting the latter, although the axes of the two sockets are offset one from the other. When the tool is in use the end-thrust of the cutter is sustained by the shoe, and the end-thrust of the shoe is sustained by the cotter. The wedging action of the cotter is sufficient to prevent "chattering" of the cutter, because the latter is assured of two separate lines of contact with the holder, throughout the length of socket 19, in consequence of cutting away the wall of the socket to provide the channel indicated at 20, these lines of contact are indicated at 26, 26. The cutter is thus rendered incapable of rocking from side to side even though the width of socket 19 should be appreciably greater than the width of the cutter, because the bottom of the cutter does not engage the bottom of the socket.

The boring device shown by Figs. 6 to 11 comprises a holder 27, shank 28 therefor, and a circular series of cutters 30, each of the latter being provided with a locking shoe 31 and with a cotter 32. The holder 27 is provided with cylindric sockets 33 for the cutters and shoes, and is provided with sockets 34 for the cotters. The cutters 30 and shoes 31 embody the structural features described in connection with the cutter and shoe first described and the cotters 32 are to all intents and purposes like the cotter 18.

The cutters, shoes, and cotters of the boring tool are all interchangeable, and in order to utilize such interchangeability for the purpose of obtaining fine adjustments of the cutters I make the shoes so that they are different one from another in the arrangement of the teeth. In the present instance the holder 27 is capable of carrying twelve cutters, and for the sake of description it may be assumed that they are divided into four groups each comprising three cutters. Such grouping however, are arbitrary. The cutter sockets 33, and the shoes 31 would preferably be numbered from one to twelve, and the shoes would be paired with the cutters so as to give the cutters in sockets #1, #5, and #9 the same degree of adjustment; the cutters in sockets #2, #6 and #10 would be advanced slightly more than those in sockets #1, #5, and #9; the cutters in sockets #3, #7, and #11 would be advanced slightly more than those in #2, #6, and #10; and those in sockets #4, #8, and #12 would be advanced slightly more than those in #3, #7, and #11.

This adjustment of the cutters is obtained by making the three shoes of each group as shown by Figs. 9, 10, and 11 respectively. Broken line $a$—$a$ intersects the centers of the cotter-receiving notches 23, the three shoes shown by these figures being in vertical registration with each other. The teeth 22 of each shoe of this group are out of registration with the teeth of the other two shoes. Broken line $a$—$a$ intersects the apex of one of the teeth of the shoe shown by Fig. 9, whereas the apex that is nearest said line in Fig. 10 is at the left of the line, and the apex that is nearest the line in Fig. 11 is at the right of the line. In assembling the twelve cutters in the head, if it is found that one shoe does not give a cutter the desired degree of adjustment, a shoe having a different arrangement of teeth 22 may be substituted for it until cutters #1, #2, #3, and #4 are adjusted to make four cuts each deeper than the one preceding it, while #5, #6, #7, and #8 are adjusted in like relation, and #9, #10, #11, and #12 are also adjusted in like relation.

The several cutters will differ slightly from each other as they are worn down and resharpened, but such differences may be taken care of by interchanging the shoes as hereinbefore explained. The increments of radial adjustment of the cutters toward and from the axis of the holder 27 are rendered comparatively fine by the aforesaid differences in the arrangement of the teeth of the shoes, and by the acute angular relation of the axes of the sockets 33 to the axis of the holder.

I claim:

1. A metal-working tool comprising a cutter having an elongated shank portion, a holder therefor having a socket for the reception of said shank portion, a locking shoe adapted to go into said socket in contiguous relation to said shank portion, said shoe and said shank portion having interlocking teeth extending transversely of the length of said shank portion, said holder having another socket extending transversely of and intersecting the first said socket, and a cotter movable endwise in said other socket, said shoe having a notch arranged to receive a portion of said cotter to lock the shoe against movement lengthwise of said cutter socket, said cotter having a shoe-engaging face arranged to force the shoe against said shank portion in consequence of moving the cotter endwise in one direction.

2. A metal-working tool comprising a cutter having an elongated shank portion, a holder therefor having a socket for the reception of said shank portion, a locking shoe adapted to go into said socket in contiguous relation to said shank portion, said shoe and said shank portion having interlocking teeth extending transversely of the length of said shank portion, said holder having another socket extending transversely of and intersecting the first said socket, and a cotter movable endwise in said other socket and having a shoe-engaging face arranged to force the shoe against said shank portion in consequence of moving said cotter endwise in one direction, said shoe having a shoulder arranged to bear against said cotter to sustain end thrust of said cutter.

3. A metal-working tool comprising a cutter having an elongated shank portion, said shank portion having a cylindric surface and a flat toothed surface, a holder for said cutter having a socket for said shank portion, a shoe having teeth complemental to the teeth on said flat surface, and a cotter arranged transversely to bear laterally against said shoe to force said cylindric surface against the wall of said socket, said wall being formed to provide two separate lines of bearing for said cylindric surface, and said shoe having a shoulder to engage said cotter.

4. A metal-working tool comprising a holder having a plurality of cutter sockets arranged in a series about a common center, cutters arranged in said sockets, respectively, a plurality of shoes, one for each of said cutters, said shoes being arranged in said sockets, said cutters and shoes having interlocking teeth, said holder having cotter sockets intersecting said cutter sockets respectively, and cotters arranged in said cotter sockets, and having shoe-engaging surfaces arranged to force said shoes against said cutters and to force said cutters against the walls of said cutter sockets, each of said shoes having a notch arranged to receive, and conforming to, the contiguous cotter, said shoes differing one from another in the arrangement of said teeth, and being interchangeable to afford relatively fine degrees of adjustment of the cutters.

5. A metal-working tool comprising a cutter and a shoe which collectively are cylindric, and which have flat bearing surfaces provided with a plurality of transverse interlocking teeth, a holder having a socket to receive said cutter and shoe when assembled, and also a transverse socket, a cotter arranged in the transverse socket for clamping the cutter and shoe in the first-mentioned socket, said shoe having a transverse socket equal in width to the cotter to receive said cotter and to hold it and the cutter against longitudinal movement.

In testimony whereof I have affixed my signature.

FRED P. LOVEJOY.

Copies of this patent may be obtained for five cents each, by addressing the "Commissioner of Patents, Washington, D. C."